United States Patent
Gabriele et al.

(10) Patent No.: US 12,354,143 B2
(45) Date of Patent: *Jul. 8, 2025

(54) SYSTEM AND METHOD FOR FACILITATING SHOPPING AND PURCHASING USING AN IDENTITY TAG

(71) Applicant: Capital One Services, LLC, McLean, VA (US)

(72) Inventors: David Gabriele, Chicago, IL (US); Michael Pankratz, Chicago, IL (US); Callie Kooiker, Chicago, IL (US); Justin Smith, Chicago, IL (US); Matthew Mitchell, Chicago, IL (US); Matthew Dabney, New York, NY (US); Justin Wishne, Chicago, IL (US); Drew Jacobs, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 681 days.

This patent is subject to a terminal disclaimer.

(21) Appl. No.: 17/701,735

(22) Filed: Mar. 23, 2022

(65) Prior Publication Data
US 2022/0215451 A1    Jul. 7, 2022

Related U.S. Application Data

(63) Continuation of application No. 16/927,151, filed on Jul. 13, 2020, now Pat. No. 11,321,757, which is a
(Continued)

(51) Int. Cl.
*G06Q 30/00* (2023.01)
*G06K 17/00* (2006.01)
(Continued)

(52) U.S. Cl.
CPC ..... *G06Q 30/0623* (2013.01); *G06K 17/0022* (2013.01); *G06Q 20/352* (2013.01);
(Continued)

(58) Field of Classification Search
CPC ............ G06Q 30/0623; G06Q 20/352; G06Q 20/4014; G06Q 20/3278; G06K 17/0022;
(Continued)

(56) References Cited

U.S. PATENT DOCUMENTS 8,630,908 B2    1/2014  Forster
9,026,462 B2 *  5/2015  Lin .................... G06Q 20/3278
                                                    705/16
(Continued)

OTHER PUBLICATIONS

Michigan company pioneers unmanned stores: RFID tags allow quick, round-the-clock transactions. (2007). Food Management, 42(11), 14(1). Retrieved from https://dialog.proquest.com/professional/docview/668494930?accountid=131444 (Year: 2007).*

(Continued)

*Primary Examiner* — Anand Loharikar
(74) *Attorney, Agent, or Firm* — TROUTMAN PEPPER LOCKE LLP; Christopher J. Forstner; John A. Morrissett

(57) ABSTRACT

The present disclosure relates to systems and methods for facilitating shopping and purchasing. The systems and methods for facilitating shopping and purchasing use an identity tag as an item tracker and/or a transaction enabler.

20 Claims, 5 Drawing Sheets

Related U.S. Application Data continuation of application No. 15/857,792, filed on Dec. 29, 2017, now Pat. No. 10,740,818.

(60) Provisional application No. 62/525,245, filed on Jun. 27, 2017, provisional application No. 62/440,478, filed on Dec. 30, 2016.

(51) Int. Cl.
| | | |
|---|---|---|
| *G06Q 20/34* | (2012.01) | |
| *G06Q 20/40* | (2012.01) | |
| *G06Q 30/0601* | (2023.01) | |
| *G06F 21/62* | (2013.01) | |
| *G06K 7/10* | (2006.01) | |
| *G06Q 20/32* | (2012.01) | |

(52) U.S. Cl.
CPC ..... *G06Q 20/4014* (2013.01); *G06F 21/6209* (2013.01); *G06K 7/10297* (2013.01); *G06K 7/10425* (2013.01); *G06Q 20/3278* (2013.01)

(58) Field of Classification Search
CPC ............ G06K 7/10297; G06K 7/10425; G06F 21/6209
See application file for complete search history.

(56) References Cited

U.S. PATENT DOCUMENTS

| | | |
|---|---|---|
| 2008/0191878 A1 | 8/2008 | Abraham |
| 2015/0254645 A1 | 9/2015 | Bondesen et al. |
| 2016/0086191 A1 | 3/2016 | Fonzi |
| 2016/0110705 A1 | 4/2016 | Papper et al. |

OTHER PUBLICATIONS

Yewatkar, A. et al., "Smart Cart with Automatic Billing, Product Information, Product Recommendation Using RFID & Zigbee with Anti-Theft," Jun. 2016; Elsevier; Procedia Computer Science 79 (2016), 793-800 (Year: 2016).

Gale, Cengage Learning; "Michigan company pioneers unmanned stores: RFID tags allow quick, round-the-clock transactions," Nov. 2007; Penton Media, Inc., Penton Business Media, Inc. and their subsidiaries; Food Management vol. 42 Issue 11 (Year: 2007).

\* cited by examiner

SYSTEM AND METHOD FOR FACILITATING SHOPPING AND PURCHASING USING AN IDENTITY TAG

CROSS REFERENCE TO RELATED APPLICATIONS

This application is a continuation of, and claims priority under 35 U.S.C. § 120 to, U.S. patent application Ser. No. 16/927,151, filed Jul. 13, 2020, which is a continuation of U.S. patent application Ser. No. 15/857,792, now U.S. Pat. No. 10,740,818, filed Dec. 29, 2017, which claims the benefit of U.S. Provisional Patent Application Nos. 62/440,478 filed on Dec. 30, 2016 and 62/525,245 filed on Jun. 27, 2017, the contents of which are fully incorporated herein by reference in their entireties.

FIELD OF THE DISCLOSURE

The present disclosure relates to systems and methods for facilitating shopping and purchasing. The systems and methods for facilitating shopping and purchasing use an identity tag as an item tracker and/or a transaction enabler.

BACKGROUND OF THE DISCLOSURE

Current systems and methods for shopping utilize scannable barcodes and price stickers to identify and facilitate the sale of a product. The product's barcode or price sticker is scanned or entered into a point-of-sale system (PoS), and the transaction is completed using the PoS.

Barcodes identify goods based on the identity at a product level, not the individualized item's identity. All goods matching a certain identity (i.e., being the same product) will have the same barcode. For example, all shirts in a specific size, color, style, etc. will have the same product identity, and, thus, the same barcode. However, each individualized item within that product identity will not be individually identifiable from one another.

The current PoS system requires that each item be scanned individually. Additionally, purchases and returns are long processes that requires verification of the purchase, the product, and the payment method. This current process creates inefficiencies for customers and store associates.

Additionally, theft of items is a problem, and companies cannot readily check for theft against stock that may or may not still be on the floor.

Current systems for delivering customer service therefore are not only burdensome for customers but also time-consuming and costly for companies providing customer service to these customers. These and other drawbacks exist.

BRIEF DESCRIPTION OF THE DRAWINGS

Various embodiments of the present invention, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
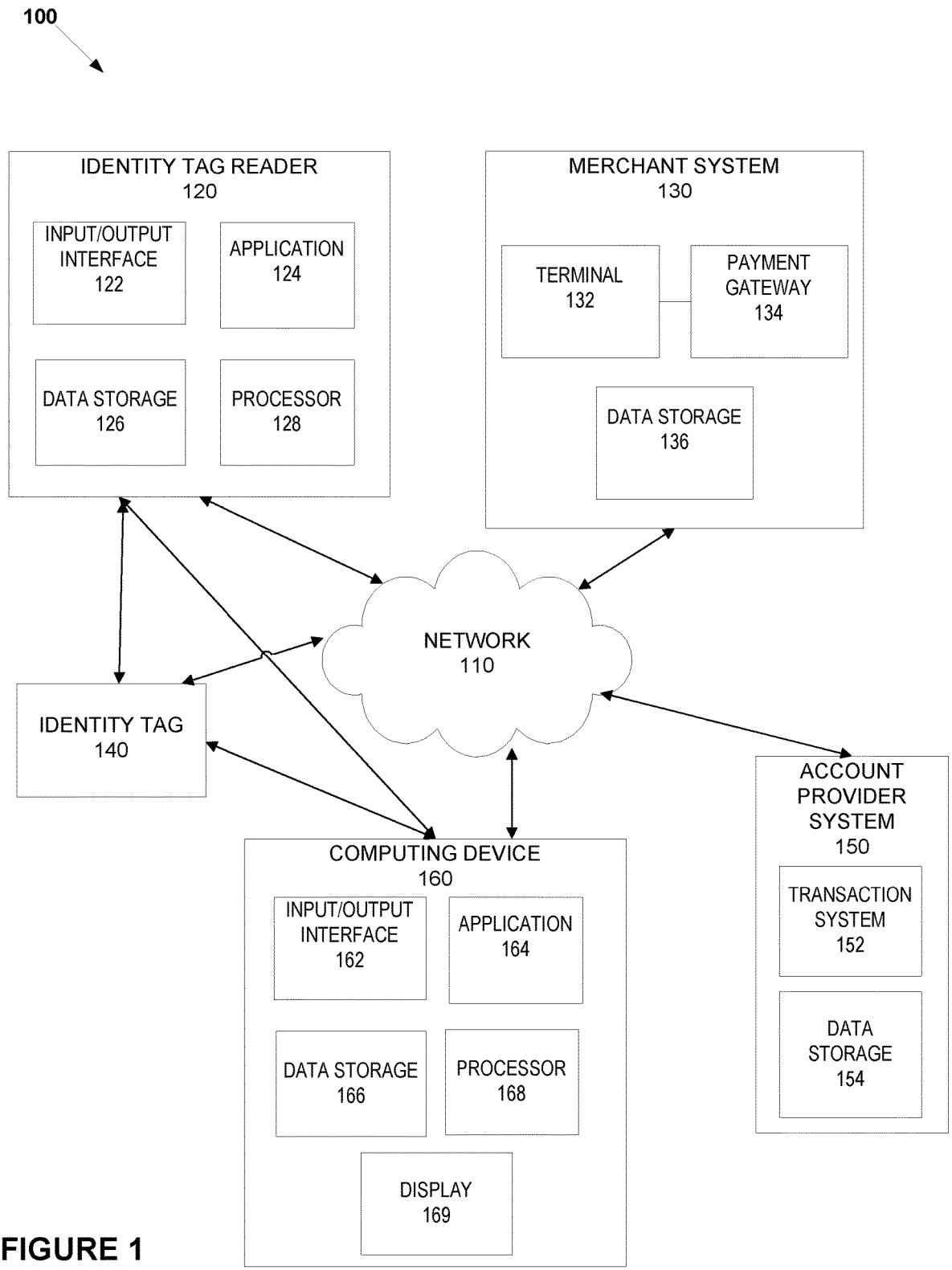
FIG. 1 depicts a schematic diagram of a system for using an identity tag to deliver information via a tag reader, according to an example embodiment of the disclosure.

The following description is intended to convey a thorough understanding of the embodiments described by providing a number of specific exemplary embodiments and details involving systems and methods for facilitating shopping and purchasing using an item identity tag. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

As described herein, an identity tag may be an application or extension of an existing application that is attached or embedded into an item. The identity tag may store a static data string identifier or the identity tag itself may be able to dynamically write and/or program itself to change information regarding the item. The identity tag may include Radio-Identification (RFID), BLUETOOTH® Low Energy (BLE), Near Field Communication (NFC), Ambient Backscatter Communication (ABC), or any other wireless technology known to one of ordinary skill in the art. Additionally, the identity tag may be passive or active. For example, a passive identity tag may respond with a static signal. An active identity tag may respond with a signal tailored to a variable, i.e., the environment, a condition, etc.

The identity tag reader may be able to detect identity tags using software to read the RFID, BLE, NFC, ABC, or other wireless technology that is included in the identity tag. Additionally, the identity tag reader may be able to determine proximity to the identity tag, (e.g., whether the identity tag is in immediate, near, or far proximity), the relation of the identity tag to other identity tags, the location of the identity tag, and the like. The identity tag reader may utilize simple distance, triangulation, or the like to determine proximity to the identity tag. For example, the identity tag may be a static object that is not broadcasting a signal but is being read by the identity tag reader, and the identity tag reader may utilize electronic mapping data to determine the proximity of the identity tag reader to the identity tag. The identity tag reader may be utilized in conjunction with multiple identity tag readers to facilitate triangulation of the item to determine location or proximity. The identity tag reader may be fixed in its location, movable, or utilize a combination of fixed and movable identity tag readers and components.

The identity tag reader may include a processor, or processors, to interpret and act on information obtained from the identity tag. The identity tag reader may be included and/or incorporated into a mobile or personal device (e.g., using a mobile application), a shopping bag and/or shopping cart, a kiosk, a gate and/or threshold, or other such device. Additionally, identity tag reader(s) may be included in physical or cloud-linked base stations throughout a store.

The physical or cloud-linked base stations throughout the store may receive information from the identity tag, analyze proximity to the identity tag, determine the location of the identity tag, and transmit the information, proximity, and/or location of the identity tag to a network for the store.

The identity tag reader may be included or incorporated into a mobile device via a mobile device application. The mobile device application may utilize the mobile device's camera, BLUETOOTH® capabilities, and/or other ways to wirelessly communicate to receive information from the identity tag.

The identity tag reader may transmit the information relating to the identity tag, such as the proximity of the identity tag, the location of the identity tag, and the identifier contained in the identity tag, to the merchant system. The merchant system may store the information relating to the identity tag, and may evaluate the information relating to the identity tag. For example, the merchant system may utilize the information relating to the identity tag to maintain real-time information regarding stock of products, locations of the item for security purposes, data relating to the item's history (e.g., the number of times an item has been moved from its display, the number of times an item has been placed in a customer's cart and not purchased, the number of times an item has been tried on, and the like), the length of time a customer has stayed in close proximity to the item, and the like. For example, the identity tag reader (e.g., a customer's mobile device) may regularly ping the identity tag to determine if the identity tag is within a certain distance of the identity tag reader. The identity tag reader may then transmit the number of responses to the pings over time received from the identity tag to calculate the length of time that a customer has stayed in close proximity to the item.

Additionally, the identity tag reader may transmit, and the merchant system may store, a database of the item's history (e.g., location history, price, purchase, return, and the like). The database may be created using a blockchain methodology such that information may be contained in a list of ordered records that may be individually timestamped and may be stored across a network. The database as such may contain information on the item as described herein, and may contain information on the item post-sale, such as the location of the item and the use of the item. The database may create a living record of the item.

The example embodiments disclosed herein are directed to systems and methods for facilitating shopping and purchasing via an identity tag.

FIG. 1 illustrates an example system for using an identity tag for shopping and purchasing. According to the various embodiments of the present disclosure, a system 100 for shopping and purchasing may include an identity tag 140, an identity tag reader 120, a merchant system 130, and an account provider system 150 connected over network 110. System 100 may utilize an open architecture that does not rely on an integration of the operating system of the identity tag reader, the merchant system, and the account provider system.

An identity tag 140 may contain a static data string identifier, or may dynamically write and program itself to change information stored within the identity tag. The identity tag 140 may include Radio-Frequency Identification (RFID), BLUETOOTH® Low Energy (BLE), Near Field Communication (NFC), Ambient Backscatter Communication (ABC), or any other wireless technology known to one of ordinary skill in the art. Additionally, the identity tag 140 may be passive or active/powered.

An identity tag reader 120 may receive product or item information from the identity tag 140 associated with a particular product or item in response to an excitation or query signal generating or triggering an output from the RFID tag. The identity tag reader 120 may contain an input/output interface 122 and an application 124. The identity tag reader 120 may include a processor 128 to interpret and act on information obtained from identity tag 140. The identity tag reader 120 may be able to detect identity tags using hardware and/or software to read the RFID, BLE, NFC, QR, ABC, or other wireless technology that is included in the identity tag 140. The identity tag reader 120 may be included and/or incorporated into a shopping bag and/or shopping cart, a kiosk, a gate and/or threshold, or other such device.

Additionally, the identity tag reader 120 may be included and/or incorporated into a computing device 160, such as mobile or personal device (e.g., using a mobile application). The computing device 160 may contain an input/output interface 162 and an application 164. The computing device 160 may include a processor 168 to interpret and act on information obtained from identity tag 140 and/or identity tag reader 120. The computing device 160 may include a display 169, for the customer to interact with the computing device 160.

The identity tag reader 120 may calculate data from the identity tag 140, such as the proximity of the identity tag 140 in relation to the identity tag reader 120. This information, such as the proximity information, may be transmitted via the network 110 or via wireless technology (e.g., RFID, BLE, NFC, ABC, and the like) from the identity tag 140 to the identity tag reader 120.

This information, such as the proximity information, may be stored in the identity tag reader 120, or may be transmitted through the network 110 to the merchant system 130. The location of the identity tag 120 may be determined using the proximity information as well as known location information of the identity tag reader 120 (e.g., if the identity tag reader 120 is in a fixed location or if the location of the identity tag reader 120 is tracked). Alternatively, the location of the identity tag 140 may be determined by first determining the location of the identity tag reader 120 using other location services (e.g., a location sensor in a fixed location in the store), then using the relevant position information to determine the location of the identity tag 140.

The identity tag reader 120 may present information such as recommendations based on the item information transmitted by the identity tag 140. Additionally, the merchant system 130 may transmit such recommendations to the identity tag reader 120.

The identity tag reader 120 may receive the proximity information from the identity tag 140 and transmit the proximity information to the merchant system 130. The merchant system 130 may transmit a payment request notification based on the proximity information to the account provider system 150. Additionally, data storage 136 on the merchant system 130 may be opened, and a secure connection between the account provider system 150 and the merchant system 130 may be established, via the network 110. Customer payment information stored in the data storage 136 of the merchant system 130 may be transmitted to the transaction system 152 of the account provider system 150 to facilitate the purchasing of the item containing the identity tag 140. Alternatively, the identity tag reader 120 may transmit customer payment information to the merchant system 130 to facilitate the purchasing of the item containing the identity tag 140.

The account provider system 150 may then transmit a completed transaction notification to the merchant system 130. The merchant system 130 may store the completed transaction information in data storage 136, and may transmit the completed transaction information to the identity tag reader 120. The identity tag reader 120 may then transmit a deactivate security request to the identity tag 140. Alternatively, the merchant system 130 may transmit the deactivate security request to the identity tag reader 120, and the identity tag reader 120 may transmit the deactivate security request to the identity tag 140. Additionally, the merchant system 130, after receiving the completed transaction information from the account provider system 150, may record the item's sale to the data storage 136. This allows the store to implement a real-time tracking of inventory.

The identity tag reader 120 may be included in or incorporated into, for example, a portable device, a shopping bag, a shopping cart, a kiosk, a gate and/or a threshold. The portable device, shopping bag, shopping cart, kiosk, gate and/or threshold may include a card reader for facilitating the purchase of the item. The card reader may include a smartcard reader, an EMV card reader, a magstripe reader, a BLE reader, and/or a NFC reader. The identity tag reader 120 may transmit the information obtained from the card reader to the merchant system 130.

The identity tag 140 may transmit, and the identity tag reader 120 may receive, proximity information regarding an item for a return of the item by the customer. The identity tag reader 120 may transmit to the merchant system 130 the item information based on the proximity of the item to the identity tag reader 120. The merchant system 130 may transmit a return notification and relevant item information (e.g., return price) to the account provider system 150 based on information stored in the data storage 136 of the merchant system 130 that indicates that the item was previously purchased. The account provider system 150 may process the return of the item using the return notification and relevant item information transferred by the merchant system 130, and may transmit a completed return notification to the merchant system 130. The merchant system 130 may transmit an activate security notification to the identity tag reader 120. The identity tag reader 120 may then transmit an activate security notification to the identity tag 140. Alternatively, the merchant system 130 may transmit the completed return notification to the identity tag reader 120, and the identity tag reader 120 may then transmit an activate security notification to the identity tag 140.

Additionally, the merchant system 130, after receiving the completed return notification from the account provider system 150, may record the item's return to the data storage 136. This allows the store to have a real-time tracking of inventory.

Identity tag reader 120 may include communications systems that may function to communicate data with external systems, determine inventory based on inventory signals, connect to peripheral devices (e.g., printers, scanners, registers), and user devices. The communications systems may be wired or wireless. The wireless communications systems may be WiFi, cellular, satellite, RF, IR, Bluetooth, BLE, NFC or any other suitable module.

The network 110 may be one or more of a wireless network, a wired network, and/or any combination of a wireless network and a wired network. For example, network 110 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 110 may include, without limitation, telephone lines, fiber optics, IEEE Ethernet 902.3, a wide area network (WAN), a local area network (LAN) or a global network such as the Internet. Also, network 110 may support an Internet network, a wireless communication network, a cellular network, or the like, or any combination thereof. Network 110 may include one network, or any number of example types of networks mentioned above, operating as a stand-alone network or in cooperation with each other. Network 110 may utilize one or more protocols of one or more network elements to which they are communicatively couples. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Identity tag reader 120 may access network 110 through one or more kiosk processors, if the identity tag reader 120 is incorporated into a kiosk, that may be communicatively coupled to the network 110.

Identity tag reader 120 may access network 110 through one or more mobile devices or personal devices, if the identity tag reader 120 is incorporated into a mobile or personal device, that also may be communicatively coupled to the network 110.

For example, a mobile device may be an PHONE®, POD®, WAD®, APPLE WATCH® from APPLE® or any other mobile device running Apple's iOS operating system, any device running Google's ANDROID® operating system, including for example, Google's wearable device, Google Glass, any device running Microsoft's WINDOWS® Mobile operating system, and/or any other smartphone or like wearable mobile device.

For example, a personal device also may include a handheld PC, a phone, a smartphone, a PDA, a tablet computer, or other device. The mobile device and/or personal device may include one or more software applications, such as a mobile application.

Identity tag reader 120 may access network 110 through one or more transmitting devices, if the identity tag reader 120 is incorporated into a shopping bag, shopping cart, gate, and/or threshold, that also may be communicatively coupled to the network 110.

An example merchant system 130, account provider system 150 and/or identity tag reader 120 may include one or more network-enabled computers to process instructions for shopping and purchasing. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 100 may execute one or more software applications for facilitating shopping and purchasing.

An example merchant system 130, account provider system 150 and/or identity tag reader 120 may include, for example, a processor, which may be several processors, a single processor, or a single device having multiple processors. A merchant system 130, account provider system 150 and/or identity tag reader 120 may access and be communicatively coupled to the network 110. A merchant system 130, account provider system 150 and/or identity tag reader 120 may store information in various electronic storage media, such as, for example, a database and/or other data storage (e.g., data storage 136, 126, 154). Electronic information may be stored in a merchant system 130, account provider system 150 and/or identity tag reader 120 in a format such as, for example, a flat file, an indexed file, a hierarchical database, a post-relational database, a relational database, such as a database created and maintained with software from, for example Oracle® Corporation, Microsoft® Excel file, Microsoft® Access file, or any other storage mechanism.

An example merchant system 130, account provider system 150 and/or identity tag reader 120 may send and receive data using one or more protocols. For example, data may be transmitted and received using Wireless Application Protocol (WAP), Multimedia Messaging Service (MIMS), Enhanced Messaging Service (EMS), Short Message Service (SMS), Global System for Mobile Communications (GSM) based systems, Time Division Multiplexing (TDM) based systems, Code Division Multiples Access (CDMA) based systems suitable for transmitting and receiving data. Data may be transmitted and received wireless sly or may utilize cabled network connections or telecom connections, fiber connections, traditional phone wireline connection, a cable connection, or other wired network connection.

Each merchant system 130, account provider system 150 and/or identity tag reader 120 of FIG. 1 also may be equipped with physical media, such as, but not limited to, a compact disc (CD), a digital versatile disc (DVD), a floppy disk, a hard drive, read only memory (ROM), random access memory (RAM), as well as other physical media capable of storing software, or combinations thereof. Merchant system 130, account provider system 150 and/or identity tag reader 120 may be able to perform the functions associated with methods for facilitating shopping and purchasing via an identity tag 140. Merchant system 130, account provider system 150 and/or identity tag reader 120 may, for example, house the software for methods for payment processing and data transmission, obviating the need for a separate device on the network 110 to run the methods housed on a merchant system 130, account provider system 150 and/or identity tag reader 120.

Furthermore, the information stored in a database may be available over the network 110, with the network containing data storage. A database housed in merchant system 130, account provider system 150 and/or identity tag reader 120 or the network 110, may store, or may connect to external data warehouses that store, for example, customer account data, item information data, product information data, and/or store inventory data.

Customer account data may include for example, account number, customer name, date of birth, address, phone number(s), email address, payment data (e.g., financial account number used to make payments, financial institution address, phone number, website, and the like), transaction history, customer preferences, and the like. Item information data may include, for example, the identity tag associated with the item. Product information data may include, for example, product description (e.g., brand, item type, size, color, style, capacity, dimensions, shape, weight, price, relevant instructions, materials, compatibility, and the like), recommendations based on the product description, and the like. Store inventory data may include for example, the number of each product available in the store, the specific identity tags associated with each item of the product, the location of each item of the product, the number of items of the product on order, the number of items of each product sold, and the like.

An account may include, for example, a credit card account, a prepaid card account, stored value card account, debit card account, check card account, payroll card account, gift card account, prepaid credit card account, charge card account, checking account, rewards account, line of credit account, credit account, mobile device account, an account related to goods and/or services, or mobile commerce account. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites.

Account provider system 150 may include systems associated with, for example, a banking service company such as CAPITAL ONE®, BANK OF AMERICA®, CITIBANK®, WELLS FARGO®, SUN TRUST®, various community banks, and the like, as well as a number of other financial institutions such as VISA®, MASTERCARD®, and AMERICAN EXPRESS® that issue credit and/or debit cards, for example, as transaction cards. Account provider system 150 may include a merchant account system. Account provider system 150 may include and/or be connected to one or more computer systems and networks to process transactions. For example, account provider system 150 may process transactions as shown and described in FIGS. 3 and 4 below. Account provider system 150 may include systems associated with financial institutions that issue transaction cards, including dynamic transaction cards, and maintains a contract with cardholders for repayment. In various embodiments, an account provider system 150 may issue credit, debit, and/or stored value account. Account provider system 150 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

Account provider system 150 may include a transaction system 152 and data storage 154. Transaction system 152 may include various hardware and software components to communicate between a merchant, acquisition system, account provider system, and/or a user device to process a transaction, such as a user purchase. Data storage 154 may store data associated with an account (e.g., card number, account type, account balance, account limits, budget data, recent transactions, pairing data such as time and date of pairing with a mobile device, and the like) and account holder data (e.g., account holder name, address, phone number(s), email address, demographic data, and the like).

Figure 2:
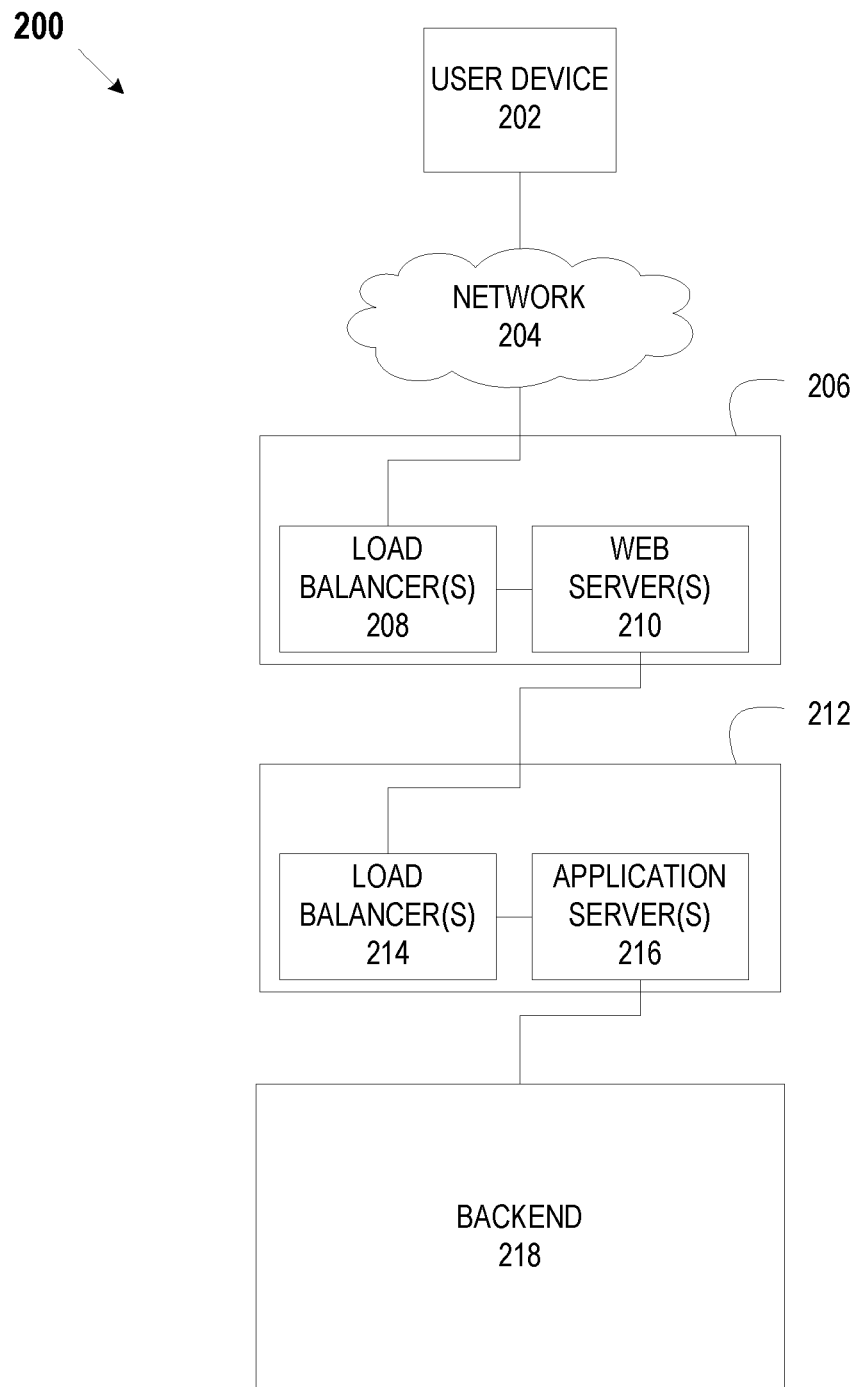
FIG. 2 depicts an example system and device to generate a user customized order interface, according to embodiments of the disclosure.

Referring to FIG. 2, which depicts an example system 200 that may enable a system, such as an account provider system 150, for example, to provide network services to its users. As shown in FIG. 2, system 200 may include a customer device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Customer device 202 may be a network-enabled computer, similar to customer device 140. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Customer device 202 also may be a mobile device: for example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/ or any other smartphone or like wearable mobile or related connected device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 208 may distribute workloads across, for example, web server(s) 210 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software monitoring the port where external clients, such as, for example, customer device 202, connect to access various services of a call center, for example. Load balancer(s) 208 may forward requests to one of the application servers 216 and/or backend 218 servers, which may then reply to load balancer 208. This may allow load balancer(s) 208 to reply to customer device 202 without customer device 202 ever knowing about the internal separation of functions. It also may prevent customer devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation; SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., customer device 202) through a network (e.g., network 204), such as the Internet. In various examples, web servers, may deliver web pages, relating to, for example, online banking applications and the like, to clients (e.g., caller device 202). Web server(s) 210 may use, for example, a hypertext transfer protocol (HTTP or sHTTP) to communicate with customer device 202. The web pages delivered to client device may include, for example, HTML or XML documents, which may include images, style sheets and scripts in addition to text content.

A user agent, such as, for example, a web browser, web crawler, or native mobile application, may initiate communication by making a request for a specific resource using a transfer protocol and web server 210 may respond with the content of that resource or an error message if unable to do so. The resource may be, for example a file on stored on backend 218. Web server(s) 210 also may enable or facilitate receiving content from customer device 202 so customer device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a call center, system supported by a call center, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., customer device 202) on the other.

Backend 218 may include hardware and/or software that enables the backend services of, for example, a customer authentication system or other entity that maintains a distributed system similar to system 200. For example, backend 218 may include a system of customer authentication records, mobile applications, online platforms, and the like. In the example where a backend 218 is associated with a financial institution, backend 218 may include a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account data, customer privacy data, and or customer authentication data. Additional databases may maintain customer account information, product databases that maintain information about products and services available to customers, content databases that store content associated with, for example, a financial institution, and the like. Backend 218 also may be associated with one or more servers that enable the various services provided by system 200.

Figure 3:
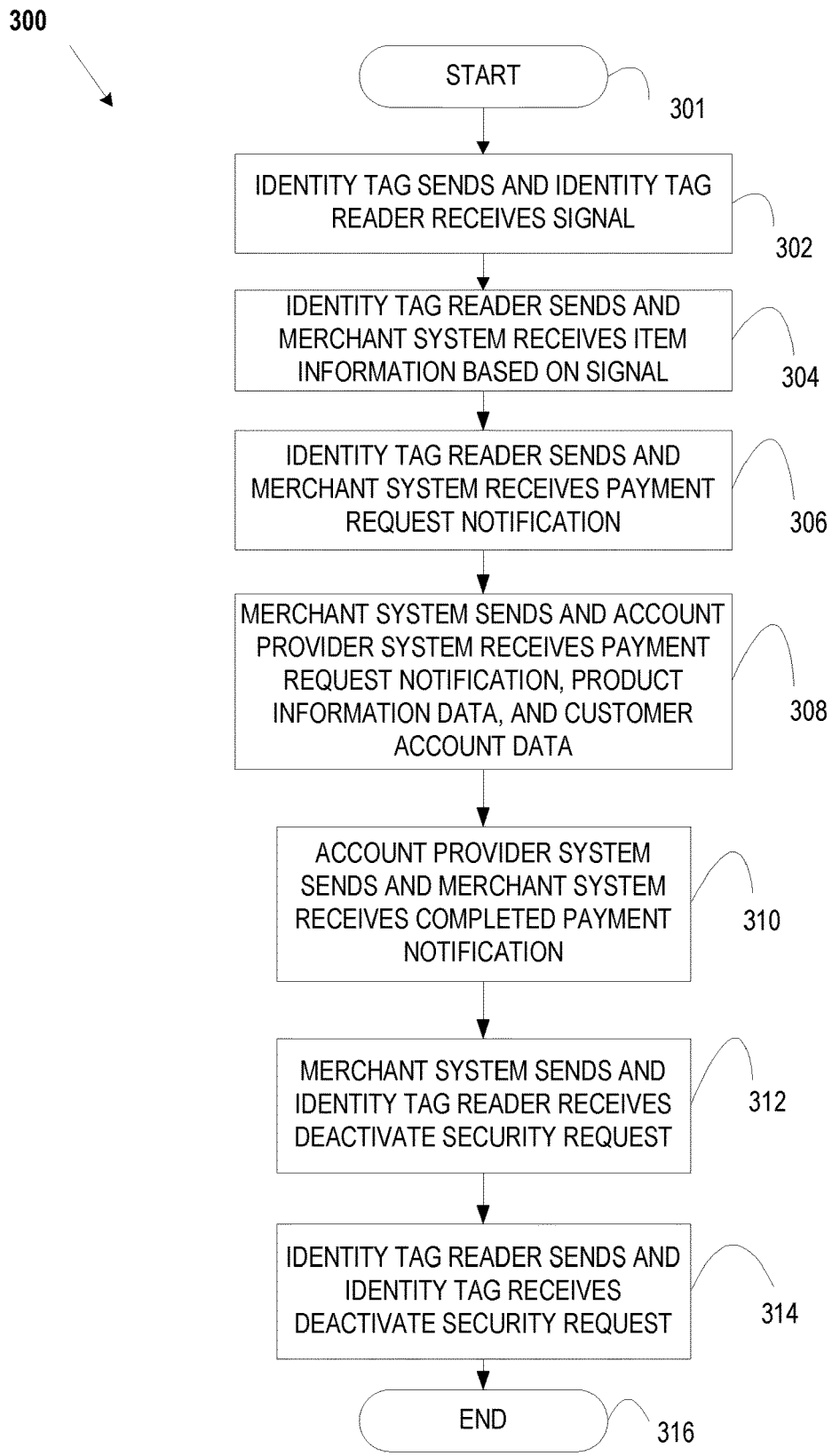
FIG. 3 illustrates a flowchart illustrating an example method for facilitating a sale via an identity tag for an item, according to an example embodiment of the disclosure.

FIG. 3 depicts a flowchart illustrating an example method for facilitating shopping and purchasing via an identity tag, according to an example embodiment. The method 300 illustrated in FIG. 3 is described using an identity tag, an identity tag reader, a merchant system, and an account holder system. One of ordinary skill in the art will understand that similar techniques for facilitating shopping and purchasing could be utilized in various other customer interaction channels referenced herein.

The method 300 may begin at block 301. At block 302, an identity tag may send and an identity tag reader may receive a signal. The signal from the identity tag may be a transmission of a static data string identifier, or may be a dynamic identifier. For example, the identity tag may store a static data string identifier, which may be unchangeable by the identity tag. Or, the identity tag may be able to dynamically write and/or program itself to change information stored directly on the tag by way of its communication with other devices, such as a dynamic identifier. At block 304, the identity tag reader may send and the merchant system may receive item information based on the signal. This item information may relate to the location of the item, the security status of the item, and the like. Based on the proximity of the item to a defined area (e.g., a gate, a threshold, etc.), at block 306, the identity tag reader may send and the merchant system may receive a payment request notification. The payment request notification may contain the item information, such as the identity tag identifier. Alternatively, the merchant system may generate the payment request notification based on the item information received from the identity tag reader.

At block 308, the merchant system may send and the account provider system may receive the payment request notification, the product information data and customer account data. Product information data may include information related to the product identity of the item, for example, the product description (e.g., brand, item type, size, color, style, capacity, dimensions, shape, weight, relevant instructions, materials, compatibility, and the like), the price, and the like. Customer account data may include for example, account number, customer name, date of birth, address, phone number(s), email address, payment data (e.g., financial account number used to make payments, financial institution address, phone number, website, and the like), transaction history, customer preferences, and the like. The account provider system may process the transaction based on the payment request notification, the product information data, and the customer account data.

At block 310, the account provider system may send and the merchant system may receive a completed payment notification. The completed payment notification may include a confirmation number for the transaction.

The merchant system may send and the identity tag reader may receive a request to deactivate the security features of the item in block 312. At block 314, the identity tag reader may send and the identity tag may receive the request to deactivate the security features. The identity tag may deactivate the security features based on that request. The method may end at block 316.

Figure 4:
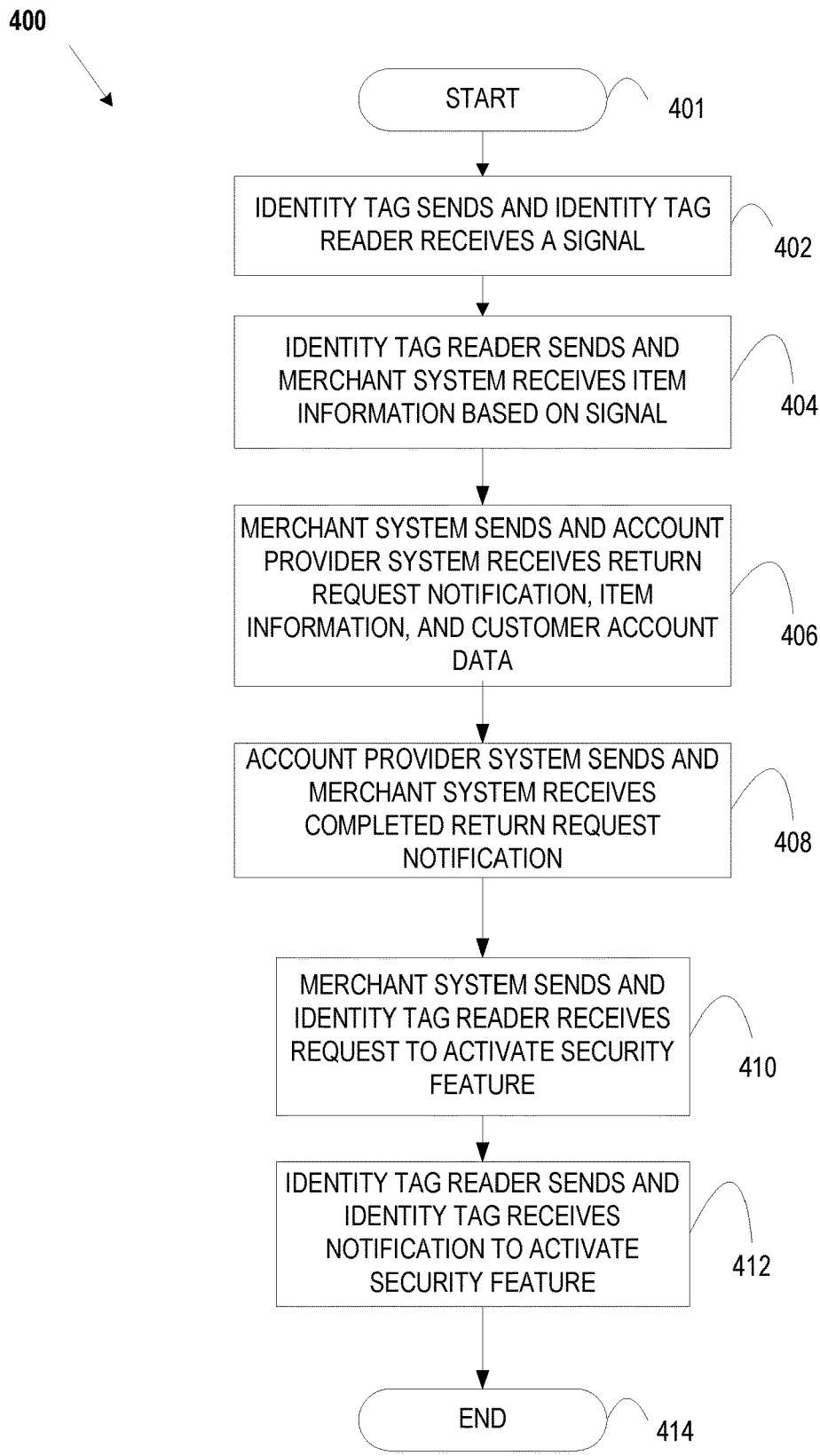
FIG. 4 depicts a flowchart illustrating an example method for facilitating a return via an identity tag for an item, according to an example embodiment of the disclosure.

FIG. 4 depicts a flowchart illustrating an example method for facilitating shopping and purchasing via an identity tag, according to an example embodiment. The method 400 illustrated in FIG. 4 is described using an identity tag, an identity tag reader, a merchant system, and an account holder system. One of ordinary skill in the art will understand that similar techniques for facilitating shopping and purchasing could be utilized in various other customer interaction channels referenced herein.

The method 400 may begin at block 401. At block 402, an identity tag may send and an identity tag reader may receive a signal. The signal from the identity tag may be a transmission of a static data string identifier, or may be a dynamic identifier. At block 404, the identity tag reader may send and the merchant system may receive item information based on the signal. This item information may relate to the item identifier based on the signal, the security status of the item, and the like.

The merchant system may compare the item information based on the signal to the data stored on the merchant system to determine the prior purchase information related to the item, such as the date of purchase, the identity of the purchaser, the customer account data related to the purchaser, and the like. If the item is eligible for return, at block 406, the merchant system may send and the account provider system may receive a return request notification, the item information, and the customer account data. The return request notification may contain the item information, such as the identity tag identifier, the price, and the like.

At block 408, the account provider system may send and the merchant system may receive the completed refund request notification. The completed refund request notification may include a confirmation number for the refund.

The merchant system may send and the identity tag reader may receive a request to activate the security features of the item in block 410. At block 412, the identity tag reader may send and the identity tag may receive the request to activate the security features. The identity tag may activate the security features based on that request. The method may end at block 414.

Figure 5:
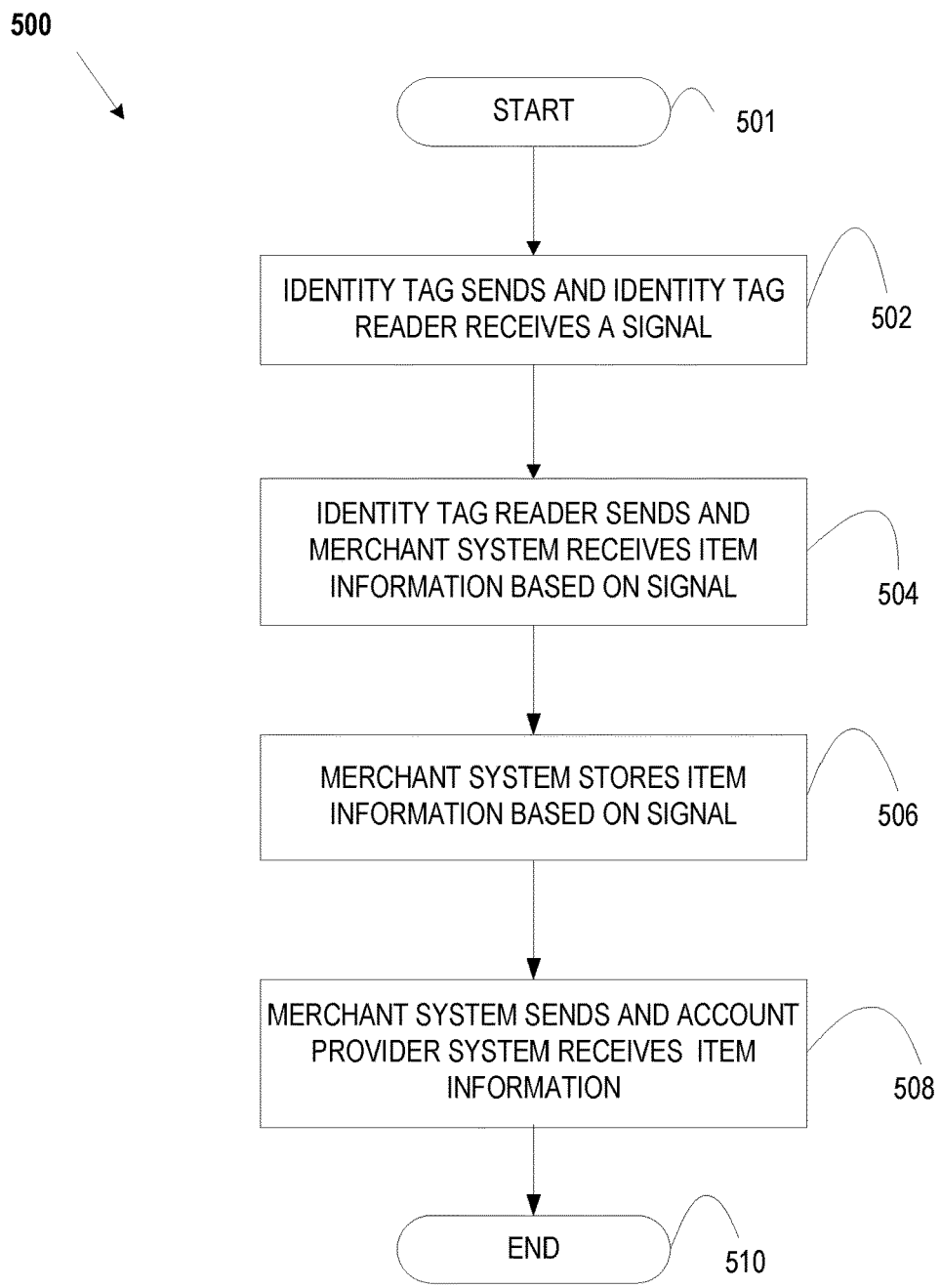
FIG. 5 depicts a flowchart illustrating an example method for tracking an item via an identity tag for the item, according to an example embodiment of the disclosure.

FIG. 5 depicts a flowchart illustrating an example method for facilitating tracking an item via an identity tag, according to an example embodiment. The method 500 illustrated in FIG. 5 is described using an identity tag, an identity tag reader, a merchant system, and an account holder system. One of ordinary skill in the art will understand that similar techniques for facilitating shopping and purchasing could be utilized in various other customer interaction channels referenced herein.

The method 500 may begin at block 501. At block 502, an identity tag may send and an identity tag reader may receive a signal. The signal from the identity tag may be a transmission of a static data string identifier, or may be a dynamic identifier. The identity tag reader may be included in or incorporated into a customer's mobile device (e.g., using a mobile application), that continues to track the item after purchase. At block 504, the identity tag reader may send and the merchant system may receive item information based on the signal. This item information may relate to the item identifier based on the signal, the security status of the item, the location of the item, the history of the location of the item, diagnostic information regarding the item, and the like.

At block 506, the merchant system may store the item information in its data storage. At block 508, the merchant system may send and the account provider system may receive the item information. The account provider system may store the item information in its data storage. The method may end at block 510.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The preceding description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system, comprising:
one or more processors; and
a non-transitory memory in communication with the one or more processors and storing instructions, that when executed by the one or more processors, are configured to cause the system to:
receive from an identity tag reader, a signal comprising an identity tag response frequency and an item identifier associated with an identity tag of an item for purchase;
process a transaction comprising the item for purchase by:
linking the item to stored item history data and stored product information data;
determining a length of time that the identity tag remains within a predetermined distance of the identity tag reader based on the identity tag response frequency; and
updating the stored item history data based on the transaction and the identity tag response frequency.

2. The system of claim 1, wherein the identity tag is active or passive.

3. The system of claim 1, wherein the identity tag reader is included in and/or incorporated into a mobile device, a personal device, a shopping bag, a shopping cart, a kiosk, a gate, and/or a threshold.

4. The system of claim 1, wherein the stored product information data comprises product descriptions, and wherein the product descriptions comprise brand, item type, size, color, style, capacity, dimensions, shape, weight, price, relevant instructions, materials, and/or compatibility.

5. The system of claim 1, wherein the stored item history data is stored within a database, the database comprising a blockchain structure.

6. The system of claim 1, wherein processing the transaction further comprises deactivating a security feature associated with the item.

7. A system, comprising:
one or more processors; and
a non-transitory memory in communication with the one or more processors and storing instructions, that when executed by the one or more processors, are configured to cause the system to:
receive from an identity tag reader, a signal comprising an identity tag response frequency and an item identifier associated with an identity tag of an item for purchase;
process a transaction comprising the item for purchase by:
linking the item to stored item history data and stored product information data;
determining a length of time that the identity tag remains within a predetermined distance of the identity tag reader based on the identity tag response frequency;
changing security features in the item based on the processing of the transaction; and
updating the stored item history data based on the transaction and the identity tag response frequency.

8. The system of claim 7, wherein the identity tag is active or passive.

9. The system of claim 7, wherein the identity tag reader is included in and/or incorporated into a mobile device, a personal device, a shopping bag, a shopping cart, a kiosk, a gate, and/or a threshold.

10. The system of claim 7, wherein the stored product information data comprises product descriptions, and wherein the product descriptions comprise brand, item type, size, color, style, capacity, dimensions, shape, weight, price, relevant instructions, materials, and/or compatibility.

11. The system of claim 7, wherein the stored item history data is stored within a database, the database comprising a blockchain structure.

12. A computer-implemented method for processing a transaction, comprising:
receiving, from an identity tag reader, a signal comprising an identity tag response frequency and an item identifier associated with an identity tag of an item for purchase;
determining a length of time that the identity tag remains within a predetermined distance of the identity tag reader based on the identity tag response frequency;
generating a transaction request notification based on an indication from a customer;
transmitting, customer account data and product information data to an account provider system for transaction processing;
linking the item to stored item history data and stored product information data;
changing security features in the item based on the processing of the transaction; and
updating the stored item history data based on the transaction and the identity tag response frequency.

13. The method of claim 12, wherein the transaction request notification is a purchase request notification.

14. The method of claim 12, wherein changing security features comprises a deactivation of the security features.

15. The method of claim 12, wherein the transaction request notification is a return request notification.

16. The method of claim 12, wherein changing security features comprises an activation of the security features.

17. The method of claim 12, wherein the identity tag is active or passive.

18. The method of claim 12, wherein the identity tag reader is included in and/or incorporated into a mobile device, a personal device, a shopping bag, a shopping cart, a kiosk, a gate, and/or a threshold.

19. The method of claim 12, wherein the product information data comprises product descriptions, and wherein the product descriptions comprise brand, item type, size, color, style, capacity, dimensions, shape, weight, price, relevant instructions, materials, and/or compatibility.

20. The method of claim 12, wherein the stored item history data comprises a data entry selected from a number of times the item has been moved from its display, a number of times the item has been placed in a customer's cart and not purchased, a number of times an item has been tried on, or combinations thereof.

* * * * *